July 9, 1963  W. A. BARDEN ETAL  3,097,316
IMPULSE MOTOR
Filed Dec. 31, 1959  3 Sheets-Sheet 1
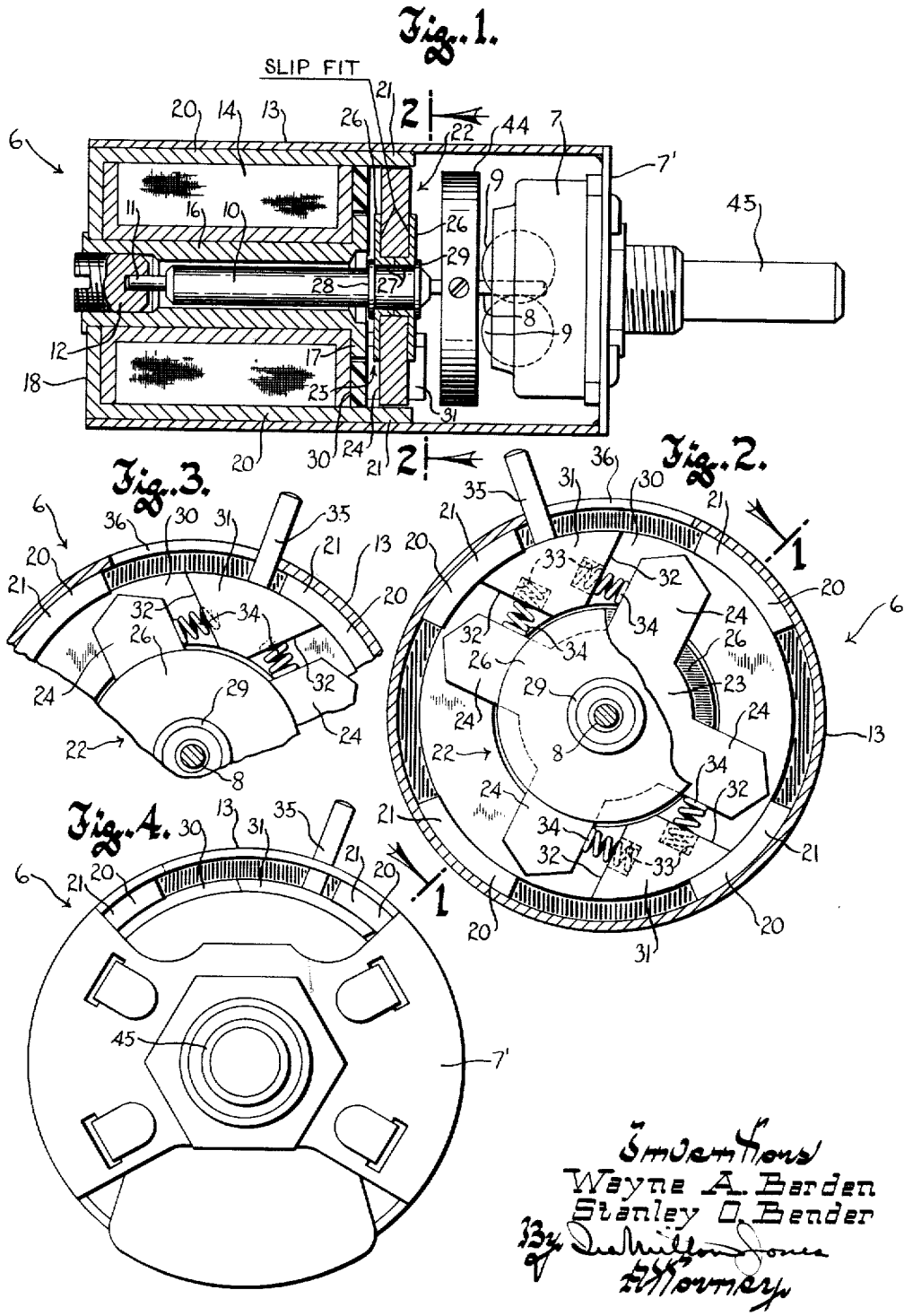
Inventors
Wayne A. Barden
Stanley O. Bender
By
Attorneys

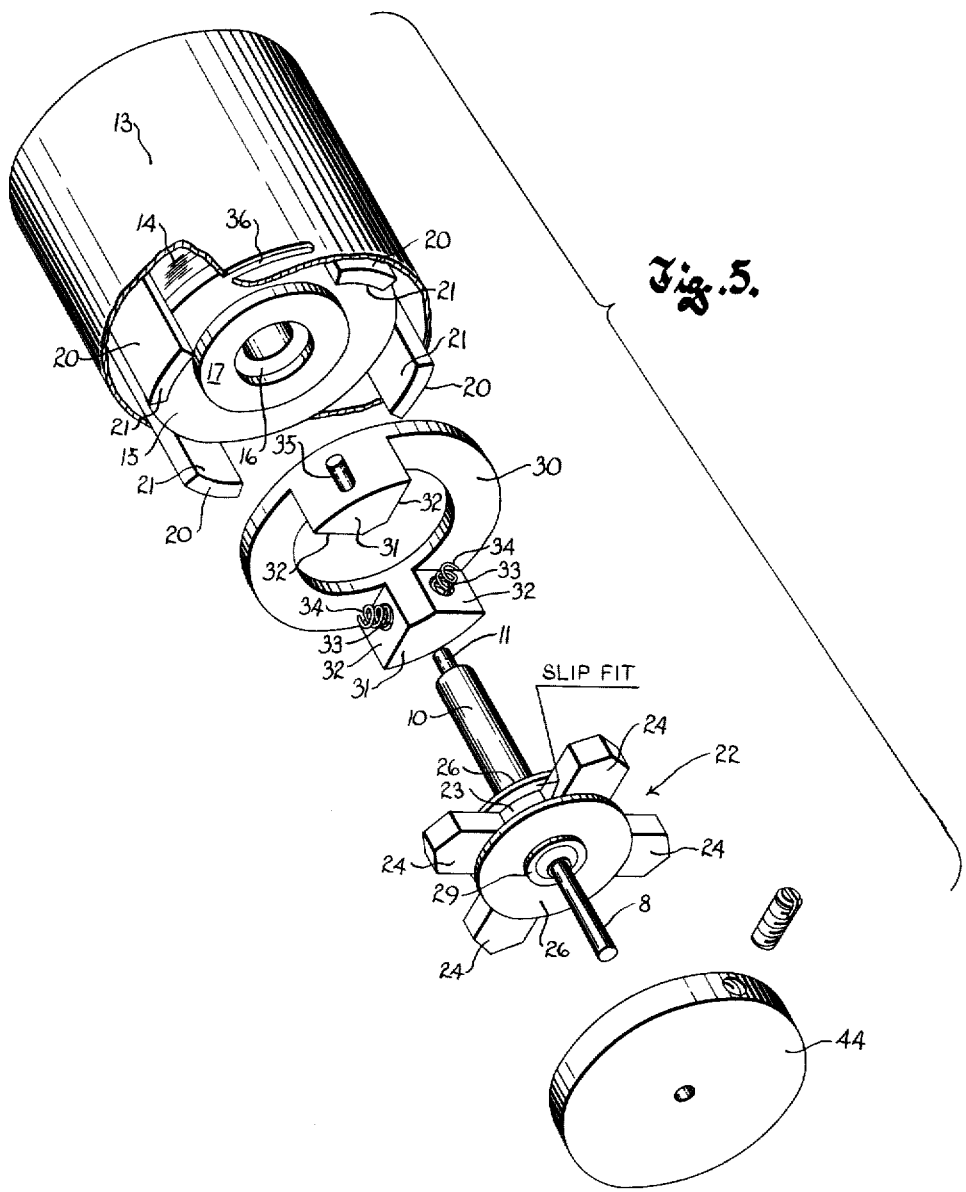

July 9, 1963   W. A. BARDEN ETAL   3,097,316
IMPULSE MOTOR
Filed Dec. 31, 1959   3 Sheets-Sheet 3
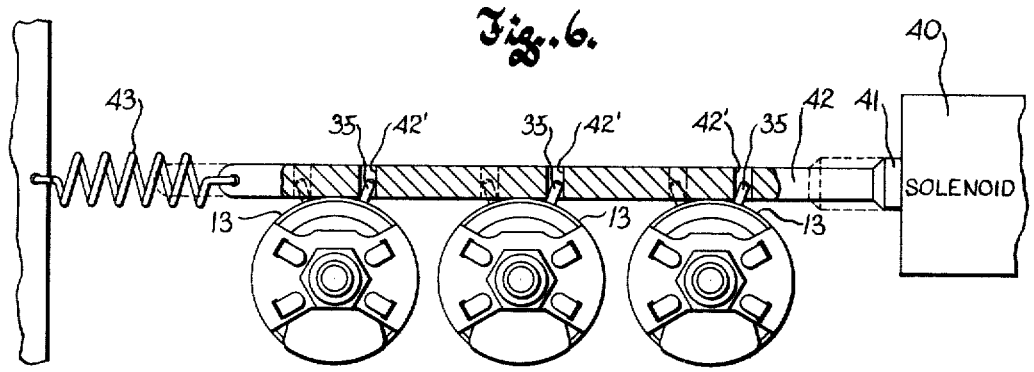
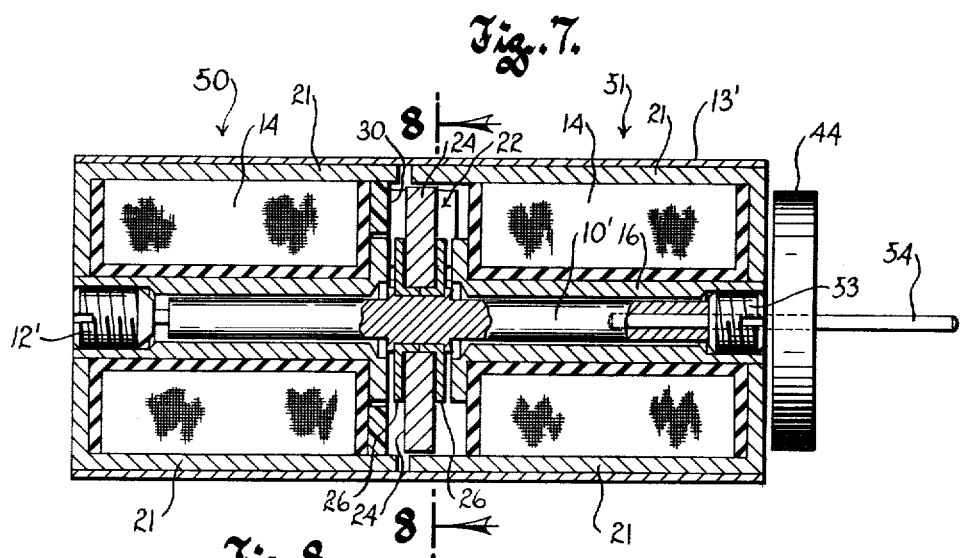
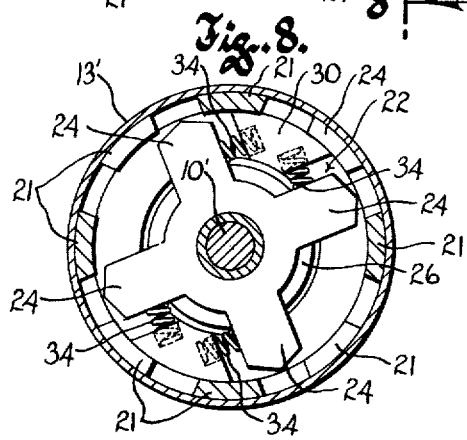
Inventors
Wayne A. Barden
Stanley O. Bender
By Ira Milton Jones
Attorney

United States Patent Office 3,097,316
Patented July 9, 1963

3,097,316
IMPULSE MOTOR
Wayne A. Barden and Stanley O. Bender, Elkhart, Ind., assignors, by mesne assignments, to CTS Corporation, Elkhart, Ind., a corporation of Indiana
Filed Dec. 31, 1959, Ser. No. 863,160
16 Claims. (Cl. 310—49)

This invention relates very generally to electric motors, and refers more particularly to small impulse motors adapted to impart incremental or stepwise rotation to the rotor of an electronic control component, as, for instance, a variable resistor or channel-selector of a television receiver equipped with remote control.

The purpose and object of this invention is to improve and simplify the construction of such impulse motors.

To that end, this invention has as another of its objects to provide an impulse motor with a magnetic clutch to connect its armature with the shaft to be driven, and in which the clutch is activated as a consequence of energization of the motor field.

It is also an object of this invention to provide an impulse motor having a very simple but highly effective speed adjustment.

Another object of this invention is to provide an impulse motor of the character described in which the direction of rotation imparted to the driven shaft may be easily and quickly set to be either clockwise or counterclockwise.

Another object of this invention is to provide an impulse motor wherein either clockwise or counterclockwise rotation may be produced with but a single electromagnet coil.

Still another object of this invention is to provide an impulse motor wherein the selection of the direction in which the motor runs or turns its driven shaft is remotely controllable by a circuit entirely independent of the energizing circuit of its electromagnet coil, so that a single rotation selecting circuit may serve a number of impulse motors to thereby simplify the control circuitry.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiment of the invention, constructed according to the best modes so far devised for the practical application of the principles thereof, and in which:

FIGURE 1 is a longitudinal sectional view through an impulse motor embodying this invention, operatively associated with a variable resistor, said view being taken substantially on the plane of the line 1—1 in FIGURE 2;

FIGURE 2 is a cross sectional view through the motor substantially on the plane of the line 2—2, and showing the motor set to effect clockwise step-by-step rotation;

FIGURE 3 is a fragmentary sectional view substantially on the plane of the line 2—2, but showing the motor set to produce counterclockwise step-by-step rotation;

FIGURE 4 is an end view of the complete unit, viewed from in front of the variable resistor;

FIGURE 5 is an exploded perspective view of the motor per se;

FIGURE 6 somewhat diagrammatically illustrates one way in which the direction of rotation of one or more of the impulse motors may be remotely controlled;

FIGURE 7 is a longitudinal sectional view through an impulse motor embodying this invention in another form; and FIGURE 8 is a cross sectional view through FIGURE 7 on the plane of the line 8—8.

Referring now particularly to the accompanying drawings, in which like numerals indicate like parts, the numeral 6 designates generally an impulse motor constructed in accordance with this invention, and operatively connected with an electrical control component 7 to impart incremental or stepwise rotation to its rotor.

The specific nature and type of the control component has no bearing upon this invention, except, of course, that it must have a rotatable control element or rotor. In the present case, the control component is a variable resistor of the type illustrated in the copending application of Wayne A. Barden et al., Serial No. 730,965, filed April 25, 1958, now Patent No. 2,935,714. In this resistor, rotation may be imparted to its rotor through a rolling ball form of vernier drive, wherein an input shaft 8 has frictional rolling engagement with a plurality of balls 9 clustered about the shaft. It is important to note that the shaft 8 is rotatably supported by the balls 9 and that the balls hold the shaft in coaxial alignment with the resistor.

More significant, however, is the fact that the shaft 8 is one end portion of the motor shaft 10 which is substantially larger in diameter and extends axially through the motor to have its opposite end portion 11, which is also smaller in diameter than the shaft proper, journalled in a bearing 12. The small diameter end portions 8 and 11 may be integral extensions of the motor shaft, or they may be provided by dowels or pins press-fitted into the ends of the shaft.

In any event, the bearing 12 and the variable resistor cooperate to rotatably mount the shaft, and to maintain the necessary coaxiality between them, they are both supported by a single cylindrical shell 13, being located at the opposite ends thereof. The resistor is conveniently secured to the shell by soldering or otherwise attaching its ground plate 7' directly thereto. The connection between the bearing 12 and the shell is more indirect, though nonetheless rigidly coaxial therewith, as will appear hereinafter.

The motor is housed entirely within the shell 13 which is formed of non-magnetic material and comprises a coil 14 wound upon a spool 15 of insulating material and which, in turn, is fitted onto a tubular core 16 of mild steel, or other suitable magnetic metal.

At its inner end, the core has an integral flange 17 which lies flat against the adjacent end of the spool and at its other end the core projects beyond the spool and through an end plate 18 of mild steel or the like, over which it is peened or rolled to clamp the spool in place and tightly join the core to the end plate.

The end plate 18 closes the adjacent end of the shell 13 to which it is suitably secured. Consequently, the end plate holds the core 16 coaxial with the shell, and since the bearing 12 is threaded into the outer end of the tubular core, it too is held coaxial with the shell by the end plate. Having the bearing 12 mounted in this manner enables adjustment of the axial position of the motor shaft for a purpose to be defined, and reduces to a minimum the friction resisting rotation of the shaft by the motor.

Projecting inwardly from the peripheral portion of the end plate 18 and embracing the coil 14, are four parallel circumferentially equispaced arms 20, the ends of which project beyond the inner end of the coil spool to provide four stationary salient magnet poles 21, it being understood that, like the core 16 and the end plate 18, the arms 20 are of mild steel, or other magnetic metal. The core 16, the end plate 18, and the arms 20 which terminate in the poles 21, thus provide four magnetic circuits each extending toroidally about the coil with an air gap between its pole 21 and the flange 17 on the inner end of the core.

An armature 22 of mild non-polarized steel, or other suitable magnetic metal, and consisting of a hub 23 and four equispaced arms 24 radiating from the hub, is freely rotatably mounted on the motor shaft 10 adjacent to but spaced slightly from the flange 17. The armature is thus embraced by the stationary salient poles 21 and, in effect, bridges the air gaps in the magnetic circuits with an effectiveness depending upon the position of rotation of the armature with respect to the stationary magnet poles. Hence, upon energization of the coil 14, the armature is magnetically attracted axially towards the coil and rotationally towards a position in which its arms 24 which form salient poles on the armature, align with the stationary salient poles 21. Obviously, of course, there will be no rotation of the armature if its salient poles are already aligned with the stationary salient poles.

The manner in which the armature is mounted on the shaft 10 enables it to serve not only as the rotor of the motor, but also as the driving member of a magnetic clutch—indicated generally by the numeral 25—to drivingly connect the armature to the motor shaft; and because the armature is non-polarized, both of these functions can be produced by the energization of the single coil 14. To enable the armature to perform both functions, it has both axial and rotary freedom on the shaft. To this end, the hub of the armature is freely rotatably journalled on the motor shaft between two parallel plates 26 which are fixed to the shaft and have hubs 27 abutting one another to form a bushing upon which the armature is journalled. The plates 26 are secured to the shaft in any suitable manner, as by having their hubs tightly clamped against a shoulder 28 on the shaft by peening over or swedging the shaft, as at 29.

Since the combined axial length of the hubs 27 is slightly greater than the thickness of the armautre has some axial freedom on the shaft and hub, the armature is normally free to rotate with respect to the plates; but when the coil 14 is energized, the resulting attraction of the armature axially toward the coil firmly clamps together the contiguous surfaces of the armature and the inner plate. The armature thus constitutes the driving member of the magnetic clutch and the inner plate provides its driven member. Attention is directed to the fact that the end thrust imposed upon the motor shaft by the engagement of the magnetic clutch is all borne by the bearing 12 which provides an almost frictionless support for the shaft.

With the clutch "engaged" as described, the motor shaft partakes of any rotation of the armature, but for the armature to be rotated as a result of energization of the coil, it is necessary that it be yieldingly held in a position of rest to one side or the other of its position of rotation at which its arms align radially with the magnet poles. This function is performed by a collar 30 of suitable insulating material—as, for instance, nylon. The collar 30 overlies the inner end of the coil spool between it and the armature, and is embraced by the four magnet poles which center the collar and freely rotatably mount the same.

Projecting axially from the collar are two diametrically opposite bosses 31, each of which is segmental in its cross sectional shape on a plane normal to the axis of the motor, so as to have angularly, preferably right-angularly disposed side faces 32. Spring pockets 33 extend down into the bosses from these surfaces and have small compression springs 34 seated therein. Each spring 34 is lightly compressed between the bottom of its socket and the adjacent armature arm 24, and together these springs yieldingly hold the armature in a position of rest determined by the position of rotation of the collar 30. Hence, by simply rotating the collar 30 this position of rest may be set to dispose the arms 24 either to the left or the right of the salient magnet poles 21, as in FIGURES 2 and 3.

When the armature is to the left of symmetrical alignment with the magnet poles 21 (the FIGURE 2 position) energization of the coil will effect clockwise rotation of the armature through an angle depending upon the extent the position of rest of the armature is displaced from the position at which its arms align with the magnet poles; and when the position of rest of the armature is to the right, as in FIGURE 3, energization of the coil results in counterclockwise rotation of the armature. By having the outer ends of the armature arms 24 V-shaped, as shown, maximum rotation of the armature is assured.

To enable rotary adjustment of the collar 30, a pin 35 is secured therein and projects through an arcuate slot 36 in the outer shell 13. The reception of the pin 35 in the slot 36 also serves to hold the collar against displacement from its position seated upon the adjacent inner end of the coil spool. As will appear from a comparison of FIGURES 2 and 3, engagement of the pin 35 with one end of the slot 36 sets the motor to produce clockwise rotation while engagement of the pin with the other end of the slot adjusts the motor for counterclockwise rotation. In either case, the armature will be yieldingly held in a position with the arms out of alignment with the magnet poles, but angularly closer to the magnet poles in one direction than the other. If this were not so, energization of the magnet coil would not result in rotation of the armature.

While the pin 35 may be manually shifted from one of its positions to the other, to do so would not be compatible with the objective of the invention which is to enable adjustment of a control component from a remote point. Hence, as shown more or less diagrammatically in FIGURE 6, mechanism is provided by which the pin 35 (and hence the collar 30) of one or more motors may be shifted by actuation of a suitable remote control. This mechanism comprises a solenoid 40 suitably mounted in fixed relation with the motor or motors, with its armature 41 connected to a bar 42. The bar 42 extends substantially tangently across the shells 13 of the motors and is yieldingly drawn away from the solenoid 40 by a tension spring 43. Holes 42' in the bar, one opposite each impulse motor, have the pins received therein so that endwise shifting of the bar in one direction by the spring 43 rocks all the collars 30 one way while energization of the solenoid 40 and consequent shifting of the bar in the opposite direction effects opposite rotation of the collars.

Energization of the solenoid may be effected from a remote point in any suitable manner as by means of a transmitter and receiver, with the latter arranged to open and close a switch in the energizing circuit of the solenoid.

An advantage of the invention can now be understood. Since the selection of the direction in which the motor turns is effected independently of the motor energizing circuit, i.e. the circuit by which the electromagnet coil 14 is energized, a single direction selecting circuit can handle any number of motors. Thus, supposing there were five impulse motors needed to actuate the controls of a television receiver from a remote control station, there would be only six energizing circuits—one for direction selection and one for each of the electromagnets of the five motors. This results in a significant reduction in control circuitry.

Upon deenergization of the coil 14, the magnetic clutch 25 is immediately disengaged and the springs 34 promptly return the armature to its position of rest. Hence, by energizing the coil with a pulsating direct or alternating current, rapidly successive rotary impulses can be transmitted to the motor shaft and, through it, to the control component driven thereby.

It has been found desirable, especially when the unit is intended for continuous stepwise rotation through a relatively large arc, to provide the motor shaft with a flywheel 44, which is most conveniently mounted upon the end portion 8 of the shaft, to which it is secured by a set screw.

As noted hereinbefore, the bearing 12 is threaded into the outer end of the core 16 and, consequently, its axial position in the unit is adjustable. This adjustability enables the armature to be shifted axially with respect to the flange 17 which, in turn, provides a simple speed adjustment for the motor. As will no doubt be obvious, a small air gap between the armature and the flange 17 produces a strong magnetic pull upon the armature so that the engagement of the magnetic clutch is very rapid, and because of the almost instantaneous engagement of the clutch, practically the entire arc of armature motion will be imparted to the shaft. Thus with each impulse the maximum amount of rotation will be imparted to the shaft and the component driven thereby.

On the other hand, adjustment of the bearing 12 to increase the air gap between the armature and the flange 17 will result in a slower motor speed, since by enlarging the air gap the magnetic pull will be weakened and, as a result, part of each arcuate advance of the armature will be completed before the clutch is engaged.

Naturally, the adjustment of the bearing must take into account the need for maintaining at least running clearance between the flange 17 and the adjacent clutch plate 29. In the opposite direction it is not too important to accurately define the limit of axial motion of the motor shaft, and, if desired, this function may be served by the flywheel 44. By adjusting the location of the flywheel on the shaft end 8, engagement with the balls 9 which form part of the control unit being driven may be used to limit endwise movement of the shaft in this direction.

Speed adjustment is also attainable by varying the angle through which the collar 30 is rotated in setting the direction of motor rotation, since by such variation the effective air gap between the salient rotor poles 24 and the stationary poles 21 may be increased or decreased. With the air gap maximum, i.e. when the position of rest of the armature is farthest removed from magnetic symmetry with the stationary poles, the output speed is greatest, and vice versa.

While the coil 14, its core 16 and the arms 20 with the poles 21, are actually an electromagnet or solenoid, they can be considered the stator of the motor, and, of course, the armature 24 and the shaft 10 with which it is drivingly connected by the magnetic clutch 25 provides the rotor for the motor.

Although it has no bearing upon the present invention—it is to be observed that the control component—namely, the variable resistor 7 may be equipped with a customary manually operable actuating shaft 45 by which its rotor may be directly and manually turned independently of the impulse motor.

Although the provision of a second coil to reverse the direction of rotation entails a substantial increase in overall size of the motor and also increases the number of control circuits required whenever more than one motor is employed in an installation, for some uses it may be advantageous to use the two coil modified embodiment of the invention shown in FIGURES 7 and 8.

In this case, there are two complete magnet units 50 and 51 in opposed end-to-end relation within the non-magnetic shell 13', with the armature 22 located between them to be rotated in one direction when the coil 14 of one of the units is energized, and in the opposite direction when the coil 14 of the other unit is energized.

As in the preferred embodiment of the invention, the armature 22 is free to turn about the shaft 10' except when energization of one of the coils draws the armature towards it and into frictional torque transmitting engagement with the clutch plate 26 which lies between the armature and the energized coil.

An advantage of the two coil form of the invention is that it can be adjusted to have a high speed output in one direction of rotation, and a low speed output in the other direction. This adjustment is effected by the simple expedient of shifting the bearings 12' and 53 axially one way or the other to bring the armature closer to one of the coil cores than the other. Such displacement from symmetry strengthens the magnetic pull exerted in one direction axially upon the armature and weakens the pull in the opposite direction with the result that the clutch is engaged more rapidly for rotation in one direction than it is for rotation in the other direction. And, as explained hereinbefore, the quicker the clutch is engaged, the greater will be the partial rotation imparted to the motor shaft with each impulse.

The bearing 12' is the same as its counterpart in the single coil embodiment of the invention. The bearing 53 is also threaded into the outer end of its respective core 16, but its bore extends entirely through it to enable the output end portion 54 of the shaft to protrude from the motor for connection with the control component or other instrumentality to be driven by the motor.

End play in the shaft mounting as well as the position of the armature between the two magnet units is adjusted by screwing the bearings 12' and 53 in or out as needed.

The provision of two coils, of course, eliminates the need for having the collar 30 rotatable. Instead, it is suitably secured in a fixed position at which its springs 34 yieldingly urge the armature to a position of rest with its arms 24 equispaced from the poles 21 of the two magnet units. Obviously, and as shown in FIGURE 8, the poles 21 of the two units are interengaged and equally spaced from one another.

From the foregoing description, taken in connection with the accompanying drawings, it will be readily apparent to those skilled in this art that the present invention provides an impulse motor which possesses many advantages over those heretofore available; that it is especially well adapted to drive one or more variable controls in a television, radio or other apparatus having such variable controls; that by energizing its electromagnet, or electromagnets in the case of the two coil embodiment, with alternating current, or pulsating direct current, the desired motion of the unit to be controlled is obtained without the production of objectionable electrical noise; that the incorporation of the magnetic clutch in such a way that the rotatable armature constitutes the driving member of the clutch, and the arrangement of all of the various parts concentrically about the shaft, assures structural simplicity and size reduction; that by virtue of the adjustable locating collar which determines the position of rest of the armature, in the preferred embodiment of the invention, either clockwise or counterclockwise rotation can be produced through energization of a single magnet coil; and that by enabling rotation to be produced in either direction by the energization of a single magnet coil, and by keeping the means for selecting the direction of rotation independent of the energization of the magnetic coil, control circuitry is reduced to a minimum since a single direction selecting circuit can serve a number of motors.

It should also be apparent to those skilled in the art that, while the motor has been described and illustrated as driving but a single control component, a number of components can be ganged in tandem and driven by the same motor shaft.

What is claimed as our invention is:

1. An impulse motor comprising: a shaft; means mounting the shaft for free rotation; an electromagnet having a core coaxial with the shaft and salient stator poles arranged concentrically about the shaft; an armature having salient poles; means mounting the armature for rotation about the shaft axis with its salient poles in position to be magnetically attracted toward radial alignment with the stator poles and for limited axial motion toward and from the core; means yieldingly holding the armature in a position of rest at which its poles are out of alignment with the stator poles, so that upon energization of the electromagnet the armature is rotated through an angle and in a direction depending upon the location of said position of rest with respect to the stator poles and attracted axially towards the core; and friction clutch means on the armature and the shaft to couple the same together for transmission of torque from the armature to the shaft, said clutch means comprising a driven element fixed to the shaft between the armature and the core, and a driving element on the armature facing the same driven element and adapted to drivingly engage the same upon attraction of the armature axially toward the core in response to energization of the electromagnet.

2. An impulse motor comprising: a drive shaft mounted for rotation; an electromagnet having a single coil surrounding the drive shaft and having stationary salient poles spaced circumferentially about the drive shaft; a non-polarized armature mounted to turn about the axis of the drive shaft and having salient poles fixed with respect thereto and positioned to form part of the magnetic circuit of the electromagnet, so that upon energization of the coil mutual magnetic attraction exists between the stationary and armature carried salient poles, which attraction rotates the armature providing it is not in a position with its salient poles in radial alignment with the stationary salient poles, the direction and extent of such rotation depending upon the position of the armature at the time the coil is energized; releasable coupling means to drivingly connect the armature with the drive shaft, so that upon concurrent activation of the coupling means and rotation of the armature by said magnetic attraction between the salient poles, rotation will be imparted to the drive shaft; and means to selectively yieldingly hold the armature in either of two positions of rotation at opposite sides of its position in which its salient poles are in radial alignment with the stationary salient poles, so that upon energization of said single coil of the electromagnet with either alternating or unidirectional pulsating current, either clockwise or counterclockwise rotation may be imparted to the drive shaft, the direction being determined by the setting of said last-named means.

3. An impulse motor comprising: an electromagnet having a coil and stationary salient poles at one end of the coil and angularly spaced from one another; a shaft mounted for rotation inside the coil with a part thereof projecting from said end of the coil; an armature on said projecting part of the shaft and adjacent to said end of the coil, the armature being loose on the shaft so that it is both axially and rotatably movable with respect to the shaft; means fixed with respect to the shaft defining the limits of axial freedom of the armature on the shaft and confining the armature to a zone in which it is always attracted axially toward said end of the coil; angularly spaced salient poles on the armature, said armature carried poles being so positioned that they form part of the magnetic circuit of the electromagnet and upon energization of the coil are attracted toward the stationary salient poles; means yieldingly urging the armature to a position of rest at which its salient poles are out of alignment with the stationary salient poles but within the field of magnetic attraction between them, so that upon energization of the coil the armature in addition to being attracted axially toward said end of the coil will be rotated through an angle and in a direction depending upon the location of said position of rest with respect to the position the armature occupies as a result of energization of the coil; and normally disengaged magnetic clutch means between the armature and the shaft comprising opposing surfaces, one fixed with respect to the armature and the other with respect to the shaft, and located between the armature and said end of the coil to drivingly couple the armature to the shaft when the armature is axially attracted toward said end of the coil by energization of the electromagnet.

4. The impulse motor of claim 3, wherein the means for yieldingly urging the armature to a position of rest is adjustable to locate said position of rest at either side of the position the armature occupies when it has responded to energization of the coil, so that by such adjustment, either clockwise or counterclockwise rotation may be produced with but the one coil of the electromagnet.

5. The impulse motor of claim 4, further characterized by the provision of remotely operable means to adjust said means for yieldingly urging the armature to a position of rest, to selectively establish said position of rest at either of two locations, in one of which the motor produces clockwise rotation and in the other it produces counterclockwise rotation.

6. The impulse motor of claim 3, wherein the means yieldingly urging the armature to a position of rest comprises a member mounted for rotation about the axis of the shaft and with respect thereto between two defined limits, and spring means connecting said member with the armature and yieldingly holding the armature in a predetermined position of rotation with respect to said member.

7. The impulse motor of claim 6 further characterized by the provision of remotely controlled means to rotate said member from one of its limits of rotation to the other and thereby enable selection of the direction in which the armature will turn in response to energization of the coil.

8. The impulse motor of claim 7 wherein said remotely controlled means comprises a spring yieldingly holding the member at one of its limits of rotation, and electromagnetic means connected with said member to rotate the same to its other limit and hold the same there against the force of said spring.

9. An impulse motor comprising: an electromagnet including a coil having a tubular core of magnetic material and stationary salient poles at the exterior of the coil, magnetically connected with the core at one end thereof to define a plurality of low reluctance flux paths toroidally encircling the coil; a shaft mounted for rotation inside the tubular core and having a part thereof projecting beyond the other end of the core; an armature on said projecting part of the shaft, the armature being loose on the shaft so as to be both axially and rotatably movable with respect to the shaft; means fixed with respect to the shaft defining the limits of axial freedom of the armature on the shaft, and confining the armature to a zone where it is always attractable toward said end of the core upon energization of the electromagnet and in position to extend across the air gap between the core and the stationary salient poles; salient poles on the armature adapted to align with the stationary salient poles when the armature is in one position of rotation; means yieldingly restraining the armature against rotating from a position of rest spaced to one side of said one position of rotation to thus dispose its salient poles out of alignment with the stationary salient poles and enable the mutual magnetic attraction between the stationary and armature carried salient poles, upon energization of the coil, to effect rotation of the armature in one direction; and a clutch which is energized by axial motion of the armature toward the core upon energization of the electromagnet, to drivingly connect the armature with the shaft.

10. The impulse motor of claim 9, wherein said magnetic clutch comprises a member fixed to the shaft between the armature and the adjacent end of the coil, to be frictionally engaged by the armature as a result of the armature being drawn axially toward the coil in consequence of energization of the coil.

11. The impulse motor of claim 10, wherein the mounting of the shaft includes an axially adjustable thrust bearing which supports the shaft against the end thrust imposed thereon by the engagement of the magnetic clutch, the axial adjustability of said thrust bearing enabling the air gap between the armature and the adjacent end of the coil to be adjusted to change the output speed of the motor.

12. In combination: an impulse motor and an instrumentality to be rotatably adjusted thereby; a shaft having one end thereof drivingly connected with said instrumentality and rotatably supported thereby; bearing means in predetermined fixed relation with said instrumentality rotatably supporting the other end of the shaft; an electromagnet having a tubular core encircling the shaft, a coil on the core, and circumferentially spaced stationary salient poles magnetically connected with the core and disposed in arcuately spaced relation in a circle adjacent to the end of the coil nearest the instrumentality to be driven; a non-polarized armature loose on the shaft between the coil and said instrumentality; salient poles on the armature to be attracted toward the stationary salient poles of the electromagnet upon energization of the latter; means yieldingly holding the armature in a position of rest at which its salient poles are out of radial alignment with the stationary salient poles, so that upon energization of the electromagnet the armature rotates from its position of rest; and magnetic clutch means to drivingly couple the armature and shaft.

13. The combination of structure set forth in claim 12, further characterized by the fact that the armature is drawn axially towards the adjacent end of the coil upon energization of the coil; and by the fact that the magnetic clutch means comprises a member fixed to the shaft between the armature and the adjacent end of the coil and having a friction surface facing the armature, and a friction surface on the armature engageable with said first named friction surface as a result of the armature being drawn axially towards the adjacent end of the coil.

14. An impulse motor comprising: an electromagnet having a coil and stationary salient poles at one end of the coil angularly spaced from one another and arranged in a circle circumscribing the coil; a shaft mounted for rotation inside the coil with a part thereof projecting from said end of the coil; an armature loose on said projecting part of the shaft and adjacent to said end of the coil to be attracted axially towards the coil; a clutch plate fixed to the shaft between said end of the coil and the armature, said plate defining the minimum axial spacing between the armature and the coil and upon energization of the coil being engaged by the armature with a frictional torque transmitting grip; angularly spaced salient poles on the armature positioned to travel in an orbit which sweeps past the stationary poles; means yieldingly urging the armature to a position of rest at which its salient poles are out of alignment with the stationary poles but within the field of their magnetic attraction so that upon energization of the coil the armature will be rotated through an angle and in a direction depending upon the location of said position of rest with respect to the position the armature occupies when its salient poles are aligned with the stationary poles, and also attracted towards the coil and into torque transmitting engagement with the clutch plate; and means to axially adjust the position of the clutch plate wtih respect to the adjacent end of the coil to thereby regulate the strength of the magnetic attraction drawing the armature axially towards the coil.

15. An impulse motor comprising: a pair of electromagnets each having a coil and magnetic circuit defining means including a tubular core inside the coil and a plurality of angularly spaced stationary poles at the periphery of the core; means securing the electromagnets in fixed coaxial relationship with the stationary poles of one interposed between and spaced from the stationary poles of the other, but with the tubular cores axially spaced apart; a rotatable shaft inside the tubular cores of the two electromagnets; a pair of axially spaced opposed abutments fixed on the shaft between the adjacent ends of the tubular cores; an armature having a hub loose on the shaft between said abutments, the hub of the armature being slightly narrower than the distance between the abutments so that upon energization of one of the electromagnets, the armature is drawn axially into torque transmitting engagement with one abutment, while upon energization of the other electromagnet the armature is drawn axially into torque transmitting engagement with the other abutment, to in each case drivingly connect the armature with the shaft; angularly spaced salient poles on the armature to travel in an orbit circumscribed by the stationary poles and to align angularly with the stationary poles of either electromagnet; and means yieldingly holding the armature in a neutral position of rotation at which its salient poles are asymmetrically disposed with respect to the stationary poles of both electromagnets, so that energization of one of the electromagnets effects rotation of the armature in one direction due to mutual magnetic attraction between its salient poles and the stationary poles of the energized electromagnet, while energization of the other electromagnet similarly effects rotation of the armature in the opposite direction, such rotation of the armature transmitting corresponding rotation to the by virtue of the establishment of one or the other of the aforesaid torque transmitting connections.

16. The structure of claim 15, further characterized by the provision of axially adjustable bearing means for the shaft by which the shaft is freely rotatably mounted but restrained against endwise shifting with respect to the electromagnets; and means to axially adjust said bearings to move the shaft axially in one direction or the other and thereby increase the magnetic pull between the armature and the core of one electromagnet while correspondingly decreasing the magnetic pull between the armature and the core of the other electromagnet.

References Cited in the file of this patent
UNITED STATES PATENTS

| | | |
|---|---|---|
| 2,548,731 | Lehde | Apr. 10, 1951 |
| 2,741,712 | Lonnquist | Apr. 10, 1956 |
| 2,825,826 | Sundt | Mar. 4, 1958 |
| 2,851,620 | Hausen | Sept. 9, 1958 |
| 2,900,589 | Putnocky | Aug. 18, 1959 |

UNITED STATES PATENT OFFICE

CERTIFICATE OF CORRECTION

Patent No. 3,097,316　　　　　　　　　　　　　　　　　July 9, 1963

Wayne A. Barden et al.

It is hereby certified that error appears in the above numbered patent requiring correction and that the said Letters Patent should read as corrected below.

Column 10, line 35, after "the", first occurrence, insert -- shaft --.

Signed and sealed this 25th day of February 1964.

(SEAL)
Attest:

ERNEST W. SWIDER　　　　　　　　　　　　　　　　　EDWIN L. REYNOLDS

Attesting Officer　　　　　　　　　　　　　　　　　Acting Commissioner of Patents